March 12, 1929.   C. R. BOSHART   1,704,999
ANIMAL TAG AND ATTACHING TOOL THEREFOR
Filed April 6, 1928
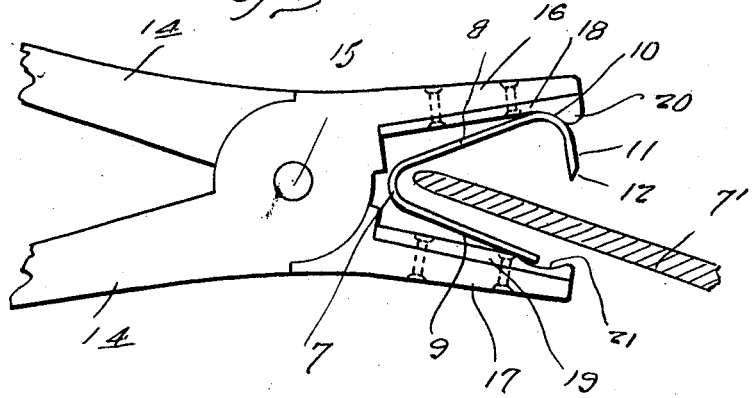
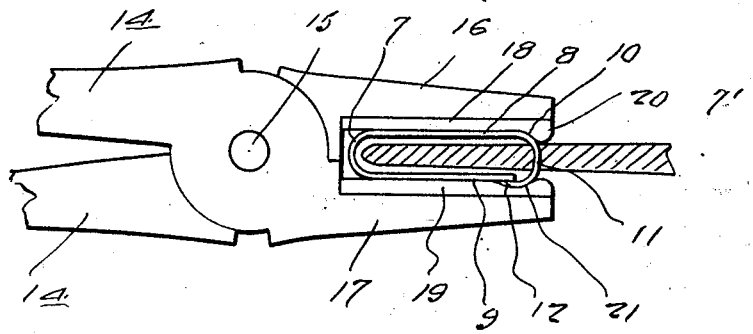
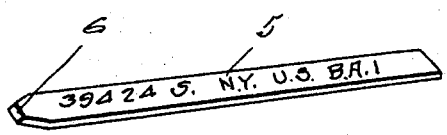
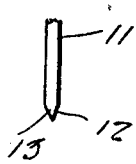
Inventor
C. R. Boshart
By Clarence A. O'Brien
Attorney Patented Mar. 12, 1929.

1,704,999

UNITED STATES PATENT OFFICE.

CHARLES R. BOSHART, OF LOWVILLE, NEW YORK.

ANIMAL TAG AND ATTACHING TOOL THEREFOR.

Application filed April 6, 1928. Serial No. 268,002.

This invention relates to an improved animal tag such as is adapted to be applied to the ear of an animal and which contains the U. S. Bureau of Animal Industry serial number.

The invention covers a new type of metal tag, as well as the tool which is constructed for attaching this particular character of tag to the ear of the animal.

The particular structural details of these parts will become more readily apparent from the following description and drawing.

In the drawing:

Figure 1 represents an elevational view of the tool and the tag showing the tag about ready to be attached to the ear of an animal.

Figure 2 is a view similar to Figure 1, showing the final step of operation of the tool and the position of the attached tag.

Figure 3 is a perspective view of the tag itself in strip form provided with the customary inspection indicia.

Figure 4 is a view showing a slightly modified end construction of the tag.

The tag is formed from a flat strip of pliable metal as indicated at 5 in Figure 3. One end portion 6 of this strip is shaped to provide a point for piercing the ear of the animal. As is usual, the customary Bureau of Animal Industry data is impressed upon the tag.

When this strip of metal is made ready for the market it assumes the shape shown in Figure 1, wherein it is bent between its ends as at 7, to provide upper and lower arm portions 8 and 9 respectively. The upper arm portion is comparatively long and has its free end portion bent to terminate in a piercing and clinching extremity 11. This extremity is bevelled as shown in Figure 3 and is also bevelled as at 12. In fact, it may be bevelled on both sides, as at 12 and 13 in Figure 4, to form an exceptionally fine or sharp point.

A special applying tool is sold in connection with the tag. The tool comprises a pair of levers 14 disposed in intersecting crossed relation and pivotally connected at 15 and terminates in jaws 16 and 17. Bolted or otherwise fastened to the inner faces of these jaws are plates 18 and 19 respectively. The plate 18 has an appropriately shaped projection or shoulder 20, while the plate 19 has a depression 21. Each plate is thus adapted for placement of the bendable tags between them, as shown in Figure 1. Thus, assuming that the ear 7' is placed between the tag ends and jaws as shown, closing of the handle of the tool will serve to force the pointed extremity of the end portion 11 of the tag through the ear and to bend it around in the seat 21 and to clinch it against the arm portion 9 as shown in Figure 2. Thus the tag is applied in a flat condition to the ear to expose the inspection data which it carries.

A tag of this character is advantageous in that it includes the sharp cutting edge which will cut freely through the ear and which will bend into shape as shown in Figure 2, in a way so as not to obstruct the lettering on the tag. It is easily, firmly and permanently attached, simple, economical, strong, smooth and durable. There are no sharp edges to abrade the ear. Tags made this way will fit very close to the ear and are smooth and will not catch on fences, wires, limbs or other objects to become loose and lost. The clinching of the sharpened end against the short arm eliminates any projection such as might catch in obstructions or cut the animal.

These and other advantages and features of the invention have doubtless been made apparent from the foregoing description and drawings. Consequently a more lengthy description is regarded unnecessary.

I claim:

1. In a new product of manufacture, an animal tag of the class described comprising a pliable strip of metal bent between its ends to provide upper and lower arm portions, the upper arm portion being comparatively long and including a curved end portion terminating in a sharpened angularly disposed extremity adapted to pierce the ear of the animal and to be bent around against the outer surface of the short arm portion to form a closed loop.

2. A tag applying implement of the class described comprising pivotally connected crossed handles including flat faced jaws having tag applying plates on the inner faces, the upper plate having a shouldered free end portion, and the lower plate having a curved recess cooperating therewith to bend and clinch the part of the tag cooperable therewith.

In testimony whereof I affix my signature.

CHARLES R. BOSHART.